UNITED STATES PATENT OFFICE.

ISAAC MONTGOMERY CLARK, OF LOMPOC, CALIFORNIA.

PROCESS OF SPRAYING TREES, &c.

SPECIFICATION forming part of Letters Patent No. 681,668, dated August 27, 1901.

Application filed April 15, 1901. Serial No. 56,005. (No specimens.)

*To all whom it may concern:*

Be it known that I, ISAAC MONTGOMERY CLARK, a citizen of the United States, residing at Lompoc, in the county of Santa Barbara and State of California, have invented a new and useful spraying process or insecticide for the destruction of all detrimental insects, microbes, and larvæ infesting fruit or ornamental trees or shrubbery, of which the following is a specification.

This invention is a new, original, and highly useful and effective means of exterminating all kinds of insects—such as San Jose scale, Greedy scale, black scale, or any insect pest, microbe, or larva—that may infest fruit or ornamental trees or shrubbery; and the component substances of which the spraying process is composed consist of kerosene-oil or any mineral oil, caustic soda or any other alkali, and water, and the said ingredients are applied to the trees or shrubbery requiring treatment in the following manner, to wit: by placing any convenient quantity of kerosene-oil or any other mineral oil in a convenient receptacle sufficiently large to retain the same and attach to said receptacle a spray-pump, through which pump the said oil may be forced in the form of a very fine spray over the trees or shrubbery to be treated until all parts thereof are completely saturated with the oil. The oil-spraying is then followed by a caustic-soda solution or any alkaline wash consisting of caustic soda or any alkali dissolved in water, the preferred proportions being one pound of caustic soda or other alkaline substance to eight gallons of water applied to the trees or shrubs in the same manner as the oil-spray heretofore referred to. The utility of said oil spraying hereinbefore referred to is intended to and does kill and destroy all scale or insect pests, microbes, or larvæ infesting the trees or shrubs in from three to eight minutes in the most effectual manner; but it is a well-known fact that kerosene or any mineral oil will completely destroy vegetable life if allowed to remain thereon unneutralized for any considerable length of time, the period of destruction ranging from several hours to several days, dependent upon the delicate condition of the fiber and foliage of the plant life treated. It is therefore necessary and absolutely essential to neutralize the oil used on the trees or shrubbery after all forms of insect pests have been effectually destroyed by the application of some substance that forms a physical union that answers the purpose of neutralization, both soothing and wholesome to the life and growth of the trees or shrubs. This the caustic-soda solution or alkaline wash does in a marked degree. Its neutralization of the oil forms a paste of a soapy consistency immediately, scientifically and minutely distributed over the trunk, limbs, branches, and leaves of the tree or shrub thus treated, and said compound thus formed is a fertilizer as well of no mean degree and is eminently advantageous to the life and growth of said tree or shrub and imparts to them luster and health by also removing all fungi that had attached to the bark of the tree of shrub.

What I claim as my invention, and desire to secure by Letters Patent, is—

The process of spraying fruit or ornamental trees or shrubbery with mineral oil, and then neutralizing the deleterious effects of the oil upon the trees or shrubbery by a second application consisting of an alkaline wash applied substantially as described.

In testimony whereof I have signed my name to this specification, at Lompoc, California, April 5, 1901, in the presence of two subscribing witnesses.

ISAAC MONTGOMERY CLARK.

Witnesses:
THOMAS FRANCIS FOX,
ELMER MECASKEY SHERIDAN.